United States Patent Office 3,239,519
Patented Mar. 8, 1966

3,239,519
SELECTED BIS(DIALKYLAMINO)ALKOXYMETHANES AND TETRAKIS(DIALKYLAMINO)ETHYLENES AND THE SYNTHESIS THEREOF
Hilmer E. Winberg, Wilmington, Del., assignor to E. I. du Pont de Nemours and Company, Wilmington, Del., a corporation of Delaware
No Drawing. Filed Feb. 20, 1962, Ser. No. 174,404
35 Claims. (Cl. 260—246)

This application is a continuation-in-part of my copending application Ser. No. 91,589, filed Feb. 27, 1961, and now abandoned, which in turn is a continuation-in-part of my copending application Ser. No. 836,062, filed August 26, 1959, and now abandoned in favor of the continuation-in-part application thereof, S.N. 91,590, filed Feb. 27, 1961.

This invention relates to, and has as its principal objects provision of, a new class of bis(disubstitutedamino)alkoxymethanes and their preparation, a new process generic to the preparation of tetrakis(disubstitutedamino)ethylenes (laternatively, per(tertiaryamino)ethylenes), and certain new tetrakis(disubstitutedamino)ethylenes.

Pruett et al., J. Am. Chem. Soc. 72, 3636 (1950), prepared the first member of the series of the tetrakis(disubstitutedamino)ethylenes, i.e., tetrakis(dimethylamino)ethylene (TMAE), by the reaction of dimethylamine with chlorotrifluoroethylene. As is true of most first members of series of organic compounds, TMAE is different from the higher straight chain analogs and is especially different from the somewhat related compounds wherein two hydrocarbon substituents on amino nitrogen (the same or different) are together joined to form nitrogen heterocyclic structures of from five to seven ring members. The difference between the first member of the series and the higher analogs and somewhat related cyclic compounds exists not only in the properties of the compounds but extends to operable methods of preparation therefor. For instance, while the reaction between chlorotrifluoroethylene and dimethylamine proceeds smoothly to afford TMAE, a similar reaction does not take place with even the next member of the secondary amine series, i.e., diethylamine.

Furthermore, this method of preparation not only does not proceed with the next higher homolog diethylamine, but does not proceed with any of the still higher homologs nor with the somewhat related cyclic secondary amines. Surprisingly, the reaction of chlorotrifluoroethylene with any secondary amine thus far tried other than dimethylamine, including both arcyclic and cyclic, has resulted in the formation of no identifiable amount of the tetrakis(disubstitutedamines) expected from analogy with the Pruett et al. reaction.

While it is not known with certainty, a reasonable explanation for the inoperability of the halogenated ethylene/secondary amine reaction in forming the higher tetrakis(disubstituted amino)ethylenes can be found in steric factors. Thus, the reaction to form TMAE appears to proceed through a conjoint addition/elimination mechanism. With the relatively small molecular size of dimethylamine, there is sufficient space around the carbon-carbon linkage of the haloethylene to permit addition of the requisite amino hydrogen and the remaining other moiety of the entering secondary amine across the C=C linkage of the haloethylene, followed by elimination of HX, so that this reaction can proceed four times to give the TMAE product. However, with the larger groups on the amine nitrogen in the higher straight chain homologs, and in particular with the more demanding space factors necessarily encountered with the cyclic amines where there is no longer free rotation about the amine-to-carbon linkages, there is simply not enough space around the carbon-carbon linkage to permit this reaction to occur the requisite four times to form the tetrakis(disubstitutedamino)ethylene. To illustrate specifically with diethylamine and chlorotrifluoroethylene, the only product obtained by pushing the reaction as far as it appears to go is 1,1-bis(diethylamino)-2-chloro-2-fluoroethylene, i.e., the addition/elimination reaction can only be achieved twice.

It has now been found, surprisingly, in contrast to the foregoing findings that the tetrakis(disubstitutedamino)ethylenes and the bis(disubstitutedamino)hydrocarbyloxymethanes intermediate thereto, the latter generically a new class of compounds, can be prepared by the ready reaction between the requisite basic secondary amine and any amide acetal, i.e., any disubstitutedamino-dihydrocarbyloxymethane, in accord with the following stoichiometry:

(1) $R_2NCH(OR')_2 + R''_2NH \leftrightarrow R''_2NCH(OR')_2 + R_2NH$ (2) $R''_2NCH(OR')_2 + R''_2NH \leftrightarrow (R''_2N)_2CHOR' + R'OH$

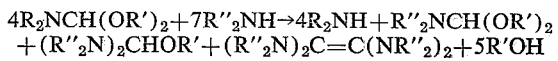

wherein the R's, which can be alike or different, are monovalent alkyl or cycloalkyl radicals, generally of no more than eight carbons each, which can be together joined (in a divalent radical) to form with the intervening nitrogen a heterocycle of from three to seven ring members; the R"s which can also be alike or different, or together joined, are monovalent (or divalent) alkyl, aryl, aralkyl, alkaryl, or cycloalkyl radicals, generally of no more than eight carbons each, and when together joined, form with the two oxygens and intervening carbon a 1,3-dioxaheterocycle of from five to seven ring members; and the R'''s which can also be alike or different or together joined, are monovalent (or divalent) alkyl or cycloalkyl hydrocarbon or oxa- and/or azahydrocarbon radicals of no more than eight carbons each, each nitrogen carrying no more than one methyl group and, in the case of the divalent radicals, no more than from two to six carbons per divalent radical. In any event, when the two R'''s are together joined, they form with the indicated amine nitrogen a monoazacarbocycle, an oxaazacarbocycle, or a diazacarbocycle of from three to seven ring members.

For reasons of easier conversion to the desired new bis(disubstitutedamino)hydrocarbyloxymethanes and tetrakis(disubstitutedamino)ethylenes, it is preferred to use the short chain hydrocarbon amide acetals, i.e., the 1,1-di(hydrocarbyloxy)disubstitutedaminomethanes wherein the substituents on the nitrogen (R in the above) are of short chain length, ideally straight chain saturated hydrocarbon and oxa- and azahydrocarbon radicals of no more than six chain members. Also strongly preferred for ease of preparation are the cyclic products, i.e., those where two R'' radicals on the same nitrogen or on different nitrogens on the same carbon are joined together to form, respectively, monoaza- and diazacarbocycles.

The over-all equation can be represented as:

$4R_2NCH(OR')_2 + 7R''_2NH \rightarrow 4R_2NH + R''_2NCH(OR')_2$
$+ (R''_2N)_2CHOR' + (R''_2N)_2C=C(NR''_2)_2 + 5R'OH$ However, such a summation equation does not fully reflect the equilibrium character nor the true product distribution, and it is believed the three foregoing simpler equations illustrate the reaction stoichiometry better.

In its product aspects the present invention is generic, not only to the bis(disubstitutedamino)hydrocarbyloxymethanes, but also such products wherein the methane hydrogen has been replaced by a monovalent hydrocarbyl radical, i.e., the α,α-bis(disubstitutedamino)-α-hydrocarbyloxyhydrocarbons. Thus, the invention is generic both process- and product-wise in accord with the following stoichiometry:

$$2R_2NC(R''')(OR')_2 + 3R''NH \rightarrow R''_2NC(R''')(OR')_2 + (R'_2N)_2C(R''')(OR') + 2R_2NH + R'OH$$

where the R's, R''s, and R'''s have the same significance as previously described and R''' is a monovalent hydrocarbon radical of up to 8 carbons and free of aliphatic unsaturation.

The only significant difference between the chemistries of these two segments of this invention, i.e., between the amide acetals, which are by definition formamide derivatives, and the amide ketals, which by definition are free of hydrogen on the carbon to which the nitrogen and the two hydrocarbyloxy radicals are linked, is that the amide ketals do not undergo the last stage of the reaction indicated for the amide acetals, i.e., elimination of two more molar proportions of the hydroxyhydrocarbyl compound, i.e., alcohol or phenol, and dimerization to form the tetrakis(disubstitutedamino)ethylenes.

It may be noted, however, that, when at least one of the R'''s is an azahydrocarbon (as in a diamine; see Examples X, XI, XII, and XIII, below), both the amino groups present react readily. The product is a cyclic compound in which the nitrogens attached to a single carbon are also joined through another radical in a ring structure. The novel products of the invention are thus of four different types, i.e., diamino alkoxymethanes and tetrakis-diamino ethylenes in each of which the two nitrogens on one carbon may be in ("Q" below), or not in, a cyclic structure with the aforementioned carbon. The formulas for these four types of compounds may be written, essentially elaborating upon the symbol R'' used in the process equations above, as follows:

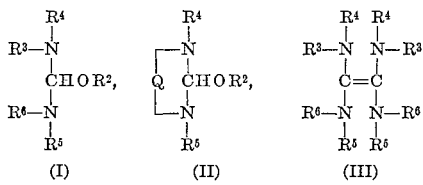

and

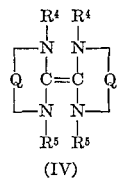

In these formulas $R^2$ is alkyl, aryl, aralkyl, alkaryl or cycloalkyl of up to 8 carbons; $R^3$ and $R^4$ are, individually, monovalent alkyl, cycloalkyl, oxahydrocarbon, azahydrocarbon, or oxaazahydrocarbon of up to 8 carbons, each depicted nitrogen carrying no more than one methyl, or, jointly, divalent alkylene, oxahydrocarbon or azahydrocarbon of 2-6 carbons; $R^5$ and $R^6$ are, individually monovalent alkyl, cycloalkyl, oxahydrocarbon, azahydrocarbon, or oxaazahydrocarbon of up to 8 carbons, each depicted nitrogen carrying no more than one methyl, or, jointly, divalent alkylene, oxahydrocarbon or azahydrocarbon of 2-6 carbons; and Q is alkylene of 1-4 carbons.

Formulas I and II above represent diamino alkoxymethanes while III and IV represent tetrakis-diamino ethylenes. II and IV also represent the cyclic structures obtained from diamines, i.e., compounds of formula $R''_2NH$ where at least one R'' is azahydrocarbon.

As can be seen from the equations for the process, the reaction is basically a substitution or substitution/condensation reaction in which the entering secondary amine moiety is substituted for the disubstitutedamino moiety of the amide acetal or ketal coreactant and, if sufficient entering secondary amine is present and the reaction conditions are sufficiently rigorous, the entering secondary amine also displaces one of the hydrocarbyloxy moieties of the amide acetal or ketal to put another secondary amino substituent in place thereof and form, as a condensation product, the corresponding hydroxyhydrocarbyl compound, i.e., the corresponding alcohol or phenol, and the bis(disubstitutedamino)monohydrocarboxyl product.

Generally speaking, the entering disubstituted amine will be of longer chain length, i.e., higher carbon content, than the disubstitutedamino moiety of the amide acetal coreactant. The reaction will be effected simply by mixing the two coreactants, generally with the secondary amine coreactant in excess, and heating. The resulting substituted secondary amine corresponding to the secondary amino moiety of the amide acetal coreactant will be removed by distillation as the reaction proceeds, as will any resulting alcohol or phenol through the condensation substitution of a second disubstitutedamino fragment for one of the hydrocarbyloxy fragments of the amide acetal or ketal. As the reaction conditions become more rigorous, e.g., in the average temperature range 25° C. to 125° C., more of the bis(disubstitutedamino)hydrocarbyloxy product will result. In a similar fashion with the formamide acetals as the reaction conditions are made still more rigorous, particularly in the temperature range 125° C. to 250° C., more of the fully substituted/condensed product, i.e., the tetrakis(disubstitutedamino)ethylene, will be formed. Formation of these latter products, i.e., the tetrakis(disubstitutedamino)ethylenes, will be found not only in the higher temperature ranges but also in the lower ranges when the less sterically hindered disubstituted amine coreactants are involved. This is especially true for the short chain diamines resulting in the cyclic amino ethylenes where steric factors, e.g., preferential ring formation, are significant since some of these products are obtained in the 80° C. range. Generally speaking, if less than six carbon atoms are found in the substituents on nitrogen in the entering disubstituted amine coreactant, steric hindrance will not disfavor the formation of the tetrakis(disubstitutedamino)ethylene.

The reaction is an easy one to carry out, requiring only that the necessary two coreactants be brought together and heated. To avoid possible side reactions and other complicating factors, the reaction is normally carried out in a dry, inert atmosphere, e.g., dry $N_2$. The substituted secondary amine corresponding to the disubstitutedamino moiety of the starting amide acetal coreactant will normally be removed by simple distillation. Ideally speaking, this disubstituted amine will be sufficiently low boiling that it can be permitted to vent as a gas through the reflux condenser of the distillation head normally used. The alcohol or phenol resulting from the condensation reaction between a second molar proportion of the entering secondary amine and one of the hydrocarbyloxy moieties of the amide acetal coreactant will normally be condensed and removed as a liquid distillate as formed.

While no reaction solvent at all is required, for ease and convenience it may sometimes be desirable to use an inert hydrocarbon or hydrocarbon ether solvent in excess to assure good contact between the two coreactants. Since many of the lower alcohols form azeotropes with various of the hydrocarbon solvents, it frequently develops that the alcohol/hydrocarbon solvent azeotrope simply is distilled from the reaction mixture, and when azeotrope formation ceases, the reaction for the formation of the bis(disubstitutedamino)hydrocarbyloxymethane is substantially complete. Under such conditions, i.e., using an inert solvent, the reaction mixture normally will not reach the temperatures necessary for the formation of the tetrakis(disubstitutedamino)ethylenes except, as mentioned before, for the diamines and resultant cyclic aminoethylenes. If the tetrasubstituted products are the desired ones, either no reaction diluent is used and the reaction is driven to completion solely thermally or, for convenience, an inert reaction solvent is used and the reaction driven to completion therewith to the formation of the bis(disubstitutedamino)hydrocarbyloxymethane. The reaction diluent will then be removed by distillation and the tetrakis(disubstitutedamino)ethylene formed by further heating of the bis(disubstitutedamino)hydrocarbyloxymethane.

From the foregoing, it is apparent that the reaction between the indicated secondary amine and the amide acetals and ketals involves a multistage equilibrium between the two said coreactants and three products:

(1) The mono(di-longer chain substituted)aminodihydrocarbyloxy product, i.e., the product resulting from substitution of the disubstitutedamino moiety of the amine coreactant for the disubstitutedamino moiety of the amide acetal or ketal coreactant;

(2) The bis(di-longer chain substitutedamino)hydrocarbyloxy product, i.e., the product resulting from substitution of the di-longer chain substituted amino moiety of the amine coreactant for one of the hydrocarbyloxy groups of the product 1; and, for the formamide acetals, (3) The tetrakis(di-longer chain substitutedamino) ethylene resulting from complete removal of hydrocarbyloxy fragments from the product 2, followed by coupling of the residue to form the substituted ethylene.

As is true of all such multistage equilibrium reactions, the identity of the major product will vary as a function of the controlling variables—here, the reaction temperature, the molar proportions of the coreactants, and the basicity and steric configuration of the amine. Operating in the lower ranges needed to effect any reaction at all, e.g., in the range 25° C. to 80° C., will result in a significant portion of the product being 1. Operating with an excess of the secondary amine coreactant and in the higher temperature ranges, e.g., in the range 80° C. to 125° C., a major portion of the product will be the bis(disubstitutedamino)monohydrocarbyloxymethane of 2. Operating with a major excess of the secondary amine and in the higher temperature ranges, e.g., in the range 125° C. to 250° C., but only for the formamide derivatives with those secondary strongly basic amines which contain a total of less than six carbon substitutents and a total of less than six carbon and heteroatom substituents on each amino nitrogen, a majority of the product will be the fully substituted tetrakis(disubstitutedamino)ethylenes.

It will be understood that the products numbered 1., above, i.e., the mono(di-longer chain substituted)aminodihydrocarbyloxy product, can be isolated if desired and/or converted to the bis-compound numbered 2 by further reaction with the secondary amine coreactant. The bis-compound can, in turn, also be separately isolated and/or converted to the tetrakis-product, 3, thermally.

As is true of all such substitution/elimination reactions, the kinetics and degree of completion, as well as ease of formation, will vary with the chain lengths of the substitutents on the coreacting amide acetals and ketals and secondary amines. Generally speaking, the reaction which will be effected first and go furthest to completion at any given reaction temperature will be the one that involves elimination of the lowest boiling product. Thus, the longer the carbon chain is on the amide moiety of the starting amide acetal or ketal coreactant, the more difficult it is for exchange and elimination to be effected by the entering secondary amine moiety of the amine coreactant. The same holds true for the chain length of the hydrocarbyloxy moiety of the amide acetal or ketal versus the entering amine moiety of the amine coreactant. Accordingly, for use of preparation, it will be apparent that the preferred amide acetal and ketal coreactants will have the shorter chain substituents in both the amine moiety and acetal or ketal moieties thereof. Thus, for an over-all reaction efficiency basis, the most outstanding and useful such coreactant is the dimethyl acetal of N,N-dimethylformamide, i.e., α,α-dimethoxytrimethylamine.

Generally speaking, it is believed that the foregoing Reactions 1 and 2 occur concomitantly, and, practically speaking, it is not believed that Reactions 1 and 2 can be effected separately quantitatively. It is to be understood that Reaction 3, i.e., the formation of the tetrakis(disubstitutedamino)ethylenes, can function only with formamide acetals. The degree of efficiency of this last reaction also depends on the basicity of the secondary amine coreactant, with increasing base strength increasing the conversion to the ethylene at any given temperature. Steric factors also are important with respect to Reaction 3, and it is only in the instance where no steric crowding exists that the tetrasubstituted ethylenes can be made. If the basicity of the amine, its steric configuration, and the reaction conditions, i. e., higher temperatures and greater excesses of the amine, are favorable, then the tetrasubstituted ethylene can be substantially the sole product of the reaction.

These considerations of the various controlling factors on the aforesaid outlined equilibria are further illustrated in the following examples in which the parts given are by weight and in which all reactions and subsequent manipulations are carried out in an inert atmosphere (dry $N_2$). These examples are submitted only to further illustrate the processes and new products of the present invention and are in no way to be taken as limitative thereof.

EXAMPLE I

*Bis(N-pyrrolidinyl)methoxymethane*

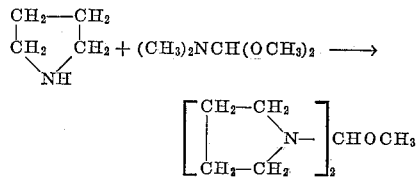

In a glass reactor fitted with a short packed distillation column, condensing means, and a distillation takeoff head, a mixture of 15.5 parts of α,α-dimethoxytrimethylamine and 18.5 parts of anhydrous pyrrolidine was heated by means of an oil bath at 102–110° C., and the dimethylamine and methanol formed by such heating were removed through the distillation head as formed. Heating was continued until no further dimethylamine or methanol was formed. The reaction residue was then purified by further distillation. There was thus obtained 12.0 parts (50% of theory) of crude bis(N-pyrrolidinyl)methoxymethane as a clear, colorless liquid boiling at 59–64° C. under a pressure corresponding to 0.35 mm. of mercury. Upon redistillation there was obtained 8.0 parts of pure bis(N-pyrrolidinyl)methoxymethane as a colorless mobile liquid boiling at 73–74° C. under a pressure corresponding to 0.85 mm. of mercury.

*Analysis.*—Calcd. for $C_{10}H_{20}N_2$: C, 65.2%; H, 10.9%; N, 15.2%.

Found: C, 65.2%; H, 10.8%; N, 15.0%.

EXAMPLE II

*Bis(N-pyrrolidinyl)methoxymethane*

A mixture of 23.8 parts of α,α-dimethoxytrimethylamine, 28.4 parts of anhydrous pyrrolidine, and 44 parts of benzene was heated at the reflux with the benzene/methanol azeotrope, boiling at 58° C. at atmospheric pressure, being removed continuously as it was formed. The dimethylamine formed concurrently was vented to the atmosphere. Heating was continued until the azeotrope no longer distilled over and the benzene was then removed by evaporative distillation. Continued distillation of the residue under reduced pressure afforded 11.1 parts (30% of theory) of bis(N-pyrrolidinyl)methoxymethane as a clear, colorless liquid boiling at 66–67° C. under a pressure corresponding to 0.65 mm. of mercury.

EXAMPLE III

*N-dimethoxymethylpyrrolidine and tetrakis(N-pyrrolidinyl)ethylene*

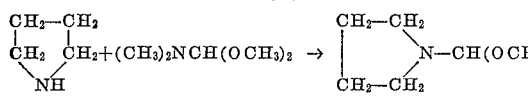 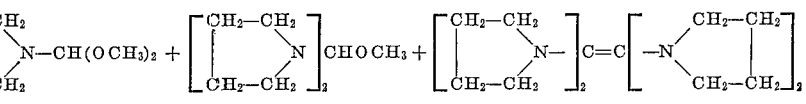

A mixture of 23.8 parts of α,α-dimethoxytrimethylamine and 28.4 parts of dry pyrrolidine was heated in a reactor as in Example I to a maximum temperature of 125° C. until distillation of dimethylamine and methanol ceased. Distillation of the residue under reduced pressure afforded 4.8 parts (17% of theory) of N-formylpyrrolidine dimethyl acetal, i.e., N-dimethoxymethylpyrrolidine, as a clear, colorless liquid boiling at 63° C. under a pressure corresponding to 25 mm. of mercury. The product on redistillation at atmospheric pressure boiled at 160° C.

*Analysis.*—Calcd. for $C_7H_{15}NO_2$: C, 57.9%; H, 10.4%; N, 9.6%. Found: C, 58.4%; H, 10.5%; N, 9.6%.

Continued distillation of the residue from the isolation of the N-dimethoxymethylpyrrolidine to a bath temperature of 170° C. under a pressure corresponding to 0.1 mm. of mercury afforded 2.2 parts (8% of theory) of bis(N-pyrrolidinyl)methoxymethane. Upon redistillation the product was obtained as a clear, colorless liquid boiling at 69° C. under a pressure corresponding to 0.80 mm. of mercury. The still residue from the isolation of the above bis(N-pyrrolidinyl)methoxymethane crystallized on cooling. On recrystallization from ethyl acetate or acetonitrile, the pure tetrakis(N-pyrrolidinyl) ethylene was obtained as white needles melting at 94–95° C., fluorescing under ultraviolet light (3660 A.), and chemiluminescing on exposure to air.

*Analysis.*—Calcd. for $C_{18}H_{32}N_4$: C, 71.0%; H, 10.6%; N, 18.4%. Found: C, 71.2%; H, 10.6%; N, 18.5%.

EXAMPLE IV

*Tetrakis(N-pyrrolidinyl)ethylene*

A mixture of 119 parts of α,α-dimethoxytrimethylamine and 142 parts of dry pyrrolidine in a glass reactor was attached to a still and heated under reflux in an oil bath at 85–106° C. Over a four-hour period 33 parts of dimethylamine was collected in a cold trap connected to the still. Methanol was then removed by distillation from the mixture as the temperature of the oil bath was slowly raised over a three-hour period to 212° C. and held at 200–212° C. for two hours. A total of 66 parts of methanol was obtained. On cooling to 90° C. the reaction residue crystallized. There was thus obtained 149.5 parts (98% of theory) of tetrakis(N-pyrrolidinyl) ethylene which after crystallization from acetonitrile melted at 91–93° C.

EXAMPLE V

A glass reactor charged with 10.75 parts of bis(N-pyrrolidinyl)methoxymethane was fitted to a distillation still and heated in an oil bath at 225° C. The methanol formed was removed by distillation. At the end of 1.5 hours of heating, there had been collected 1.8 parts (theory 1.87 parts) of methanol. The reaction residue solidified on cooling and there was thus obtained 8.9 parts (100% of theory) of tetrakis(N-pyrrolidinyl)ethylene which after recrystallization from ethyl acetate melted at 95–96° C.

EXAMPLE VI

*N-dimethoxymethylpiperidine, bis(N-piperidino)methoxymethane, and tetrakis(N-piperidino)ethylene*

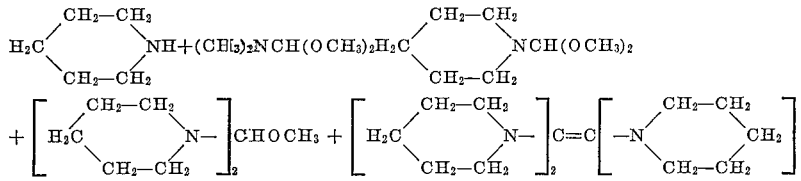

A mixture of 23.8 parts of α,α-dimethoxytrimethylamine and 37.5 parts of dry piperidine was heated in a reactor as described in Example I in an oil bath at 100–140° C. until distillation of dimethylamine and methanol ceased. Distillation of the reaction residue under reduced pressure afforded 4.0 parts (12.5% of theory) of N-formylpiperidine dimethyl acetal, i.e., N-dimethoxymethylpiperidine, as a clear, colorless liquid boiling at 76° C. under a pressure corresponding to 22 mm. of mercury.

*Analysis.*—Calcd. for $C_8H_{17}NO_2$: N, 8.8%. Found: N, 8.6%.

Continued distillation of the residue from the isolation of the above N-dimethoxymethylpiperidine at a bath temperature of 160° C. afforded 18.7 parts (44% of theory) of bis(piperidino)methoxymethane as a clear, colorless liquid boiling at 105° C. under a pressure corresponding to 4 mm. of mercury; $n_D^{25}$, 1.4798.

*Analysis.*—Calcd. for $C_{12}H_{24}N_2O$: C, 67.9%; H, 11.4%; N, 13.2%. Found: C, 67.9%; H, 11.4%; N, 12.9%.

The still residue from the distillation of the above bis(piperidino)methoxymethane solidified on cooling. There was thus obtained 14.5 parts (40% of theory) of tetrakis(piperidino)ethylene as a crystalline product melting at 53–59° C. After recrystallization from ethyl acetate, the purified product melted at 59.0–61.5° C.

*Analysis.*—Calcd. for $C_{22}H_{40}N_4$: C, 73.3%; H, 11.2%; N, 15.5%. Found: C, 72.8%; H, 11.9%; N, 15.5%.

EXAMPLE VII

*Tetrakis(N-piperidino)ethylene*

A mixture of 59.5 parts of α,α-dimethoxytrimethylamine and 170 parts (2.0 molar proportions based on the amine) of anhydrous piperidine in a glass reactor was attached to a still as in Example I and was heated at the reflux in an oil bath until evolution of dimethylamine ceased. Methanol was then distilled from the reaction mixture as the temperature of the heating bath was slowly raised over a period of eight hours to 140° C. A total of 31.6 parts (theory, 32 parts) of methanol was obtained. Removal of all material (including excess piperidine) volatile below a bath temperature of 170° C., while maintaining the reactor at a pressure corresponding to 0.55 mm. of mercury, afforded 80 parts (89% of theory) of tetrakis(piperidino)ethylene as a residue which crystallized on cooling. After recrystallization from acetonitrile, the product melted at 59–61° C.

EXAMPLE VIII

*Bis(N-morpholino)methoxymethane and tetrakis-(N-morpholino)ethylene*

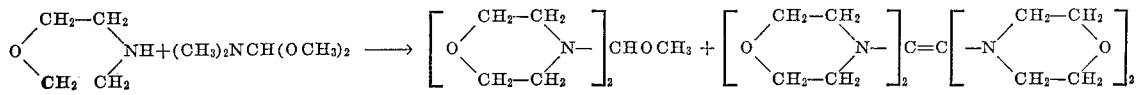

A mixture of 26.8 parts of α,α-dimethoxytrimethylamine and 41.2 parts of anhydrous morpholine was heated in a glass reactor attached to a still as in Example I at the reflux in an oil bath at 98–110° C. After 2.5 hours under these conditions, dimethylamine evolution ceased. Methanol was then distilled from the reaction mixture as the temperature of the bath was slowly raised over a period of four hours to 200° C. and held at that temperature for an additional 0.5 hour. Continued distillation under reduced pressure afforded 20.4 parts (42% of theory) of bis(morpholino)methoxymethane as a clear, colorless liquid boiling at 103–108° C. under a pressure corresponding to 1.0–1.2 mm. of mercury. On cooling, the product crystallized and melted at 64–67.5° C. after recrystallization from methylcyclohexane.

Analysis.—Calcd. for $C_{10}H_{20}N_2O_3$: C, 55.5%; H, 9.3%; N, 13.0%. Found: C, 55.7%; H, 9.2%; N, 13.2%.

On cooling, the still residue from the isolation of the above bis(morpholino)methoxymethane solidified. There was thus obtained 21.8 parts (41% of theory) of tetrakis(morpholino)ethylene. After recrystallization from ethyl acetate, the product melted at 170–171° C.

Analysis.—Calcd. for $C_{18}H_{32}N_4O_4$: N, 15.2%. Found: N, 15.4%.

EXAMPLE IX

*Bis[N-(N'-methyl)piperazinyl]methoxymethane and tetrakis[N-(N'-methyl)piperazinyl]ethylene*

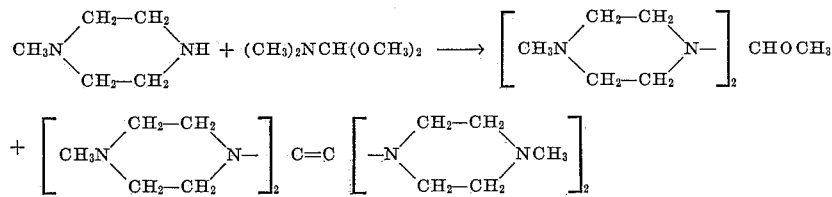

As in Example I, a mixture of 11.9 parts of α,α-dimethoxytrimethylamine and 20.0 parts of N-methylpiperazine was heated at 130–210° C. until evolution of dimethylamine and methanol had ceased. Continued distillation of the reaction mixture under reduced pressure afforded 7.8 parts (32% of theory) of bis[N-(N'-methyl)piperazinyl]methoxymethane as a clear, colorless liquid boiling at 106–110° C. under a pressure corresponding to 0.9 mm. of mercury.

Analysis.—Calcd. for $C_{12}H_{26}N_4O$: C, 59.5%; H, 10.8%. Found: C, 59.9%; H, 10.8%.

On cooling, the still residue from the isolation of the above substituted methoxymethane crystallized. There was thus obtained 11.1 parts (53% of theory) of tetrakis[N-(N'-methyl)piperazinyl]ethylene which after recrystallization from acetonitrile melted at 79.0–80.5° C.

Analysis.—Calcd. for $C_{22}H_{44}N_8$: N, 26.6%. Found: N, 26.6%.

EXAMPLE X

*1,1',3,3'-tetramethyl-Δ$^{2,2'}$-bi(imidazolidine)*

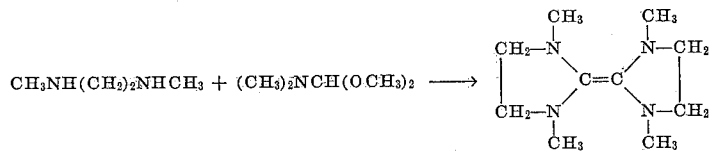

As in Example I, a mixture of 29.8 parts of α,α-dimethoxytrimethylamine and 23.3 parts of N,N'-dimethylethylenediamine was heated in an oil bath at 100–156° C. until evolution of dimethylamine and methanol had ceased. Continued distillation of the reaction residue afforded 20.4 parts (83% of theory) of 1,1',3,3'-tetramethyl-Δ$^{2,2'}$-bi(imidazolidine) as a clear, colorless liquid which boiled at 96–97° C. under a pressure corresponding to 8 mm. of mercury and which crystallized on cooling to a low melting solid. This bicyclic tetrakis(disubstitutedamino)ethylene chemiluminesces strongly in air with evolution of heat. Solutions of the product in cyclohexane also chemiluminesce strongly in the presence of air.

Analysis.—Calcd. for $C_{10}H_{20}N_4$: C, 61.2%; H, 10.3%. Found: C, 61.2%; H, 10.5%.

EXAMPLE XI

*1,1',3,3'-tetraethyl-Δ$^{2,2'}$-bi(imidazolidine)*

As in Example I, a mixture of 87 parts of α,α-dimethoxytrimethylamine and 85 parts of N,N'-diethylethylenediamine was heated under reflux in an oil bath at 85–105° C. until evolution of dimethylamine became slow. Methanol was then distilled from the reaction mixture as the bath temperature was slowly raised until a final temperature of 200° C. was reached. Continued distillation of the reaction mixture under reduced pressure afforded 69.5 parts (76% of theory) of 1,1',3,3'-tetraethyl-Δ$^{2,2'}$-bi(imidazolidine) as a light yellow liquid boiling at 79–82° C. under a pressure corresponding to 0.5 mm. of mercury. The product chemiluminesced strongly on exposure to air.

Analysis.—Calcd. for $C_{14}H_{28}N_4$: C, 66.6%; H, 11.2%; N, 22.2%. Found: C, 66.9%; H, 11.3%; N, 21.9%.

EXAMPLE XII

*1,3'-diethyl-1',3-dimethyl-Δ$^{2,2'}$-bi(imidazolidine)*

A mixture of 23.8 parts of α,α-dimethoxytrimethylamine and 20.4 parts of N-ethyl-N'-methylethylenediamine was heated in a reactor as described in Example I to a bath temperature of 160° C. over a period of six hours, with the dimethylamine and methanol evolved in the reaction being removed by distillation. Essentially the theoretical quantity of the latter was obtained. Continued distillation of the reaction residue under reduced pressure afforded 17.2 parts (77% of theory) of 1,3'-diethyl-1',3-dimethyl-Δ$^{2,2'}$-bi(imidazolidine) as a light yellow liquid boiling at 80–82° C. under a pressure corresponding to 0.25 mm. of mercury. The product chemiluminesced strongly on exposure to air.

Analysis.—Calcd. for $C_{12}H_{24}N_4$: C, 64.2%; H, 10.8%; N, 25.0%. Found: C, 64.2%; H, 11.0%; N, 24.4%.

EXAMPLE XIII

*1,3-dimethyl-2-methoxyhexahydropyridine and 1,1',-3,3'-tetramethyl-Δ²,²'-bi(hexahydropyrimidine)*

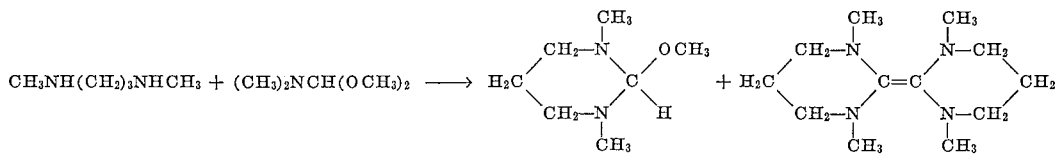

Example II was substantially duplicated using 73.4 parts of α,α-dimethoxytrimethylamine, 62.6 parts of N,N'-dimethyl-1,3-propanediamine, and 132 parts of benzene. Distillation of the reaction residue afforded 20.8 parts (24% of theory) of 1,3-dimethyl-2-methoxyhexahydropyrimidine as a colorless liquid boiling at 62–66° C. under a pressure corresponding to 25 mm. of mercury.

*Analysis.*—Calcd. for $C_7H_{16}N_2O$: C, 58.3%; H, 11.2%; N, 19.4%. Found: C, 58.6%; H, 11.2%; N, 19.4%.

Continued distillation of the reaction residue after removal of the 1,3-dimethyl-2-methoxyhexahydropyrimidine afforded 23.3 parts (34% of theory) of 1,1',3,3'-tetramethyl-Δ²,²'-bi(hexahydropyrimidine) as a light yellow liquid boiling at 104–105° C. under a pressure corresponding to 8.5 mm. of mercury. The product luminesced strongly on exposure to air.

*Analysis.*—Calcd. for $C_{12}H_{24}N_4$: N, 25.0%. Found: N, 25.1%.

EXAMPLE XIV

*1-dimethoxymethyl-2,5-dimethylpyrrolidine and Bis[N-(2,5-dimethylpyrrolidinyl)]methoxymethane*

A mixture of 11.9 parts of α,α-dimethoxytrimethylamine and 19.8 parts of 2,5-dimethylpyrrolidine was heated in a reactor as described in Example I with the bath temperature slowly rising over a period of 4.5 hours from 113–175° C. and the methanol and dimethylamine formed during the heating being removed by distillation. The bath temperature was then raised to 200° C. and held for two hours, distilling off all material boiling below 110° C. from the reaction mixture. Continued distillation under reduced pressure afforded 7.0 parts (40% of theory) of N-formyl-2,5-dimethylpyrrolidine dimethyl acetal, i.e., 1-dimethoxymethyl-2,5-dimethylpyrrolidine, as a clear, colorless liquid boiling at 90–91° C. under a pressure corresponding to 49 mm. of mercury.

*Analysis.*—Calcd. for $C_9H_{19}NO_2$: C, 62.4%; H, 11.0%; N, 8.1%. Found: C, 62.6%; H, 11.1%; N, 8.7%.

Continued distillation of the reaction mixture after removal of the 1-dimethoxymethyl-2,5-dimethylpyrrolidine afforded 3.54 parts (15% of theory) of bis[N-(2,5-dimethylpyrrolidinyl)]methoxymethane as a clear, colorless liquid boiling at 134–138° C. under a pressure corresponding to 24 mm. of mercury.

*Analysis.*—Calcd. for $C_{14}H_{28}N_2O$: C, 70.0%; H, 11.7%; N, 11.6%. Found: C, 70.3%; H, 11.6%; N, 12.4%.

EXAMPLE XV

*Di-n-propylaminodimethoxymethane and bis(di-n-propylamino)methoxymethane*

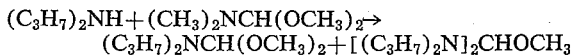

Example XIV was substantially duplicated using 23.8 parts of α,α-dimethoxytrimethylamine and 44.5 parts of di-n-propylamine with bath temperatures ranging from 100° C. to 160° C. over an 8-hour reaction period with removal of the methanol and dimethylamine as formed. Continued distillation of the residue at reduced pressure afforded 18.1 parts (52% of theory) of N,N-di-n-propylformamide dimethyl acetal, i.e., di-n-propylaminodimethoxymethane, as a clear, colorless liquid boiling at 68–70° C. under a pressure corresponding to 13 mm. of mercury.

*Analysis.*—Calcd. for $C_9H_{21}NO_2$: N, 8.0%. Found: N, 8.1%.

Continued distillation of the reaction mixture upon removal of the above amide acetal afforded 3.4 parts (7% of theory) of bis(di-n-propylamino)methoxymethane as a clear, colorless liquid boiling at 105° C. under a pressure corresponding to 7 mm. of mercury.

*Analysis.*—Calcd. for $C_{14}H_{32}N_2O$: C, 68.8%; H, 13.2%; N, 11.5%. Found: C, 68.8%; H, 12.9%; N, 11.6%.

EXAMPLE XVI

*Bis[bis(dimethylamino)methyleneamino]methoxymethane and tetrakis[bis(dimethylamino)methyleneamino]ethylene*

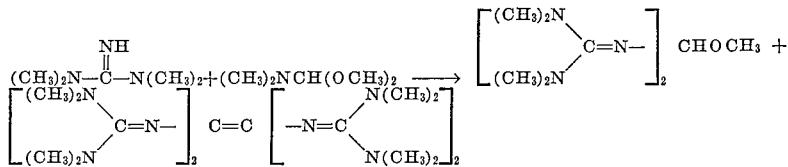

A mixture of 11.9 parts of α,α-dimethoxytrimethylamine and 23 parts (two molar proportions based on the methane) of 1,1,3,3-tetramethylguanidine was heated as in Example I over a period of 2–3 hours with the bath temperature at about 125° C. removing the dimethylamine and methanol formed during the reaction. The residual liquid was distilled under reduced pressure to afford 10.6 parts (39% of theory) of bis[bis(dimethylamino)methyleneamino]methoxymethane as a clear, colorless liquid boiling at 96–98° C. under a pressure corresponding to 0.9 mm. of mercury; $n_D^{25}$ 1.4863.

*Analysis.*—Calcd. for $C_{11}H_{28}N_6O$: C, 52.9%; H, 10.4%; N, 30.9%. Found: C, 52.8%; H, 10.2%; N, 30.5%.

A portion (8 parts) of the above bis[bis(dimethylamino)methyleneamino]methoxymethane was heated at 250° C. until no further methanol was evolved. The reaction residue was cooled and the resultant crystalline solid recrystallized three times from ethyl acetate to afford 3.1 parts (43% of theory) of the tetrakis[bis(dimethylamino)methyleneamino]ethylene as white crystals melting at 70–72° C.

*Analysis.*—Calcd. for $C_{22}H_{48}N_{12}$: C, 52.5%; H, 10.1%; N, 37.5%. Found: C, 52.2%; H, 9.8%; N, 37.7%.

EXAMPLE XVII

*1,1′,3,3′-tetrabenzyl-Δ$^{2,2'}$-bi(imidazolidine)*

A mixture of 22.2 parts of α,α-dimethoxytrimethylamine, 45 parts of N,N′-dibenzylethylenediamine, and 66 parts of benzene was heated under reflux in an oil bath at 83–103° C. until the evolution of dimethylamine became slow. Methanol was then removed by distillation as the methanol/benzene azeotrope. There was obtained 45 ml. of distillate, B.P. 52–58° C. (theory 37.5 ml., B.P. 58° C.). All volatiles were than removed from the reaction mixture at room temperature and under a pressure corresponding to 0.1 mm. of mercury. The solid residue of crude product weighed 47.9 g. (theory 46.8 g.). After two crystallizations from ethyl acetate the very light yellow needles of 1,1′,3,3′-tetrabenzyl-Δ$^{2,2'}$-bi(imidazolidine) melted at 162–164° C.

*Analysis.*—Calcd. for $C_{34}H_{36}N_4$: N, 11.2%. Found: N, 10.8%.

This invention is generic to a new process for the preparation of new tetrakis(disubstitutedamino)ethylenes, a generically new class of bis(disubstitutedamino)monohydrocarbyloxyhydrocarbons, a process for the preparation thereof, and also to new types of tetrakis(disubstitutedamino)ethylenes, especially those wherein the amine nitrogens form part of a heterocyclic structure. The reaction involves a condensation between the requisite secondary amine and the desired amide acetal or ketal whereby the amine hydrogen in the coreactant secondary amines unites with one hydrocarbyloxy group of the amide acetal or ketal to liberate one molar proportion of the resultant hydroxy-substituted hydrocarbon, e.g., alcohol or phenol, and/or the amine moiety, i.e., the amine nitrogen and two hydrocarbon radical substituents thereon, replace the amine moiety in the starting amine acetal, liberating the said amine moiety in the form of the amine resulting from addition of the entering secondary amine hydrogen to the replaced moiety. In the case of the formamide acetals, provided sufficient quantities of the secondary amine coreactant are present and the reaction conditions are sufficiently stringent, the reaction can go beyond the stage of the formation of the new amide acetal involving the entering amine moiety and the bis(disubstitutedamino)monohydrocarbyloxy hydrocarbon and form the tetrakis(disubstitutedamino)ethylenes, all as in accord with the stoichiometry discussed in detail in the foregoing.

The requisite amide acetal and ketal intermediates can be prepared by the method of Meerwein, Angew, Chem. 71, 530 (1959), by reaction between a hydrocarbon ether, a hydrocarbyl fluoride, and silver fluoborate to form a trihydrocarbyloxonium fluoborate which is then reacted with the requisite N,N-dihydrocarbyl-substituted carboxamide to form the intermediate oxonium fluoborate derivative of the amide, i.e., an α-(N,N-dihydrocarbylamino)-α-(hydrocarbyloxy)hydrocarbonium fluoborate, which is subsequently further reacted with an alkali metal alcoholate to form the desired amide acetal or ketal and, as a co-product, the alkali metal fluoborate. Also, as disclosed in the same reference, the intermediate higher amide acetals and ketals can be prepared by alcohol exchange with the lower amide acetals and ketals in accord with the following stoichiometry:

$$R_2NCR'(OR'')_2 + 2R'''OH \rightarrow R_2NCR'(OR''')_2 + 2R''OH$$

where R‴ is of greater carbon content than R″.

In view of the inate complexity of the silver fluoborate synthesis, the latter, i.e., the alcohol exchange route, will, for convenience reasons, generally be preferred. Thus, the silver fluoborate synthesis will normally be used to prepare the first member of the series, i.e., the dimethyl acetal of N,N-dimethylformamide, which will then be used in alcohol exchange to prepare any desired higher hydrocarbyloxy amide acetals. The same generally applies to any desired higher hydrocarbylamino amide acetals and ketals in which an amine exchange reaction in accord with the following stoichiometry will serve to prepare any desired higher hydrocarbylamino amide acetals and ketals:

$$R_2NCR'(OR'')_2 + R_2'''NH \rightarrow R_2'''NCR'(OR'')_2 + R_2NH$$

where R‴ is of greater carbon content than R.

In both these alcohol and amine exchange reactions, the cyclic products can also be obtained, i.e., by the use of a glycol to obtain the cyclic hydrocarbyloxy moiety or by use of a cyclic secondary amine to obtain the cyclic amino moiety of the amide acetals and ketals.

The preferred method of preparing the necessary intermediate amide acetals and ketals involves the reaction of an alkali metal or alakaline earth metal salt of the desired alcohol or phenol with the requisite α,α-dihalo-substituted tertiary amine in accord with the following stoichiometry:

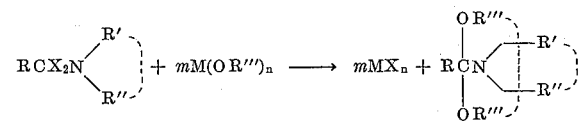

wherein R′ and R″, which can be alike or different, are monovalent alkyl or cycloalkyl radicals of no more than 8 carbons each, which can be together joined as a divalent radical with the intervening nitrogen to form a saturated heterocycle of 3–7 ring members (the broken lines indicating the possibility of joinder between the groups terminating the same), said divalent radicals containing no more than 26 carbons each; R is hydrogen or a monovalent alkyl, aryl, aralkyl, alkaryl, or cycloalkyl hydrocarbon radical of no more than 8 carbons or

the X's, which can be alike or different, are halogens of atomic No. from 9–35; M is an alkali metal or an alkaline earth metal; R‴ is a monovalent alkyl, aryl, aralkyl, alkaryl, or cycloalkyl radical of no more than 8 carbons; and *m* and *n* are integers from 1–2, inclusive, depending on the valence of the metal M and such that *m*+*n*=3.

When *n* is 2, the R‴ radicals can be together joined to form with the intervening carbon and two oxygens a 1,3-dioxacarbocycle of 5 to 7 ring members. This preferred synthesis of the intermediates forms the subject of the coassigned copending application of Brown U.S.' Patent No. 3,092,637.

In addition to the aforesaid defined new bis(disubstitutedamino)-α-hydrocarbyloxyhydrocarbons and the new, particularly cyclic, tetrakis(disubstitutedamino) ethylenes and the necessary amide acetal or ketal and secondary amine coreactants given in the foregoing detailed examples, other such coreactants of these same generic types can be so similarly used to give still further species within the purview of the present broad product invention. Thus, there can be used such other formamide acetals as N-(dimethoxymethyl)-N-methyl-n-octylamine, N-diethoxymethyldiisobutylamine, N-diethoxymethyl-N-ethyl-p-toluidine, N-diethoxymethylpyrrolidine, N-diisopropoxymethylmorpholine, N,N-dimethylformamide dimethyl acetal and the like. In preparing the new tetrakis(disubstitutedamino)ethylenes and in particular the especially outstanding cyclic tetrakis(disubstitutedamino) ethylenes, there can be used such other secondary amines as ethyleneimine, i.e., aziridine, azetidine, i.e., azacyclobutane, perhydroazepine, Δ$^3$-pyrroline, i.e., 2,5-dihydroazoline, 1,2,2-trimethylhydrazine, N,N′-di-n-dodecyclethleneldiamine and the like. Reaction of these additional amine species with the dimethyl acetal of N,N-dimethylformamide results, respectively, in the formation of the following tetrakis(cyclic and acyclic disubstitutedamino)ethylenes of the present invention: 1,1,2,2-tetrakis(1-aziridinyl)ethylene, 1,1,2,2,-tetrakis(1-azetidinyl)ethylene, 1,1,2,2 - tetrakis(1 - hexahydroazepinyl)ethylene, 1,1,2,2-tetrakis(1-2,5-dihydroazolinyl)ethylene, i.e., 1,1,2,2-tetrakis(1-$\Delta^3$-pyrrolinyl)ethylene, 1,1,2,2 - tetrakis[1 - (1,2,2-trimethylhydrazinyl)]ethylene, 1,1',3,3'-tetra-n - dodecyl-$\Delta^{2,2'}$-bi(imidazolidine) and the like.

Further, the invention is generic to the use of such amide ketals as N,N-dimethylbenzamide dimethyl acetal, i.e., $\alpha,\alpha$-dimethoxyphenyldimethylamine, N-acetylpyrrolidine diethyl ketal, i.e., 1-($\alpha,\alpha$-diethoxyethyl)pyrrolidine, N,N-dimethylcaproic acid amide dimethyl ketal, i.e., $\alpha,\alpha$-dimethoxy-n-hexyldimethylamine, N,N-dimethyltrifluoroacetamide dimethyl ketal, i.e., $\alpha,\alpha$-dimethoxy-$\beta,\beta,\beta$-trifluoroethyldimethylamine, and the like, which, using the reaction conditions and variables outlined in the foregoing, on reaction with such cyclic amines or disubstituted diamines as N,N'-dimethylethylenediamine, pyrrolidine, morpholine, N,N'-dimethyl-1,3-propanediamine, and the like, will form, respectively, the following bis(disubstitutedamino)monohydrocarbyloxyhydrocarbons of the present invention:

1,3-dimethyl-2-methoxy-2-phenylimidazoline,
$\alpha,\alpha$-bis(N-pyrrolidinyl)ethyl ethyl ether,
$\alpha,\alpha$-bis(morpholino)-n-hexyl methyl ether,
1,3-dimethyl-2-trifluoromethyl-2-methoxyhexahydropyrimidine, and the like.

The new bis(disubstitutedamino)monohydrocarbyloxyhydrocarbons of the present invention are strong bases and accordingly are useful for catalysis of base-catalyzed reactions, especially in organic systems due to their solubility therein, and particularly in catalyzing such reactions as: the addition of alcohols to $\alpha$-$\beta$ unsaturated nitriles, cyanoethylation reactions in general using acrylonitrile, additions to activated double bonds such as illustrated in U.S. 2,822,376, and the like. They are also useful as water scavengers in organic systems, particularly in view of their good organic solubility, and especially because unlike other organic-soluble water scavengers they result in non-corrosive products.

These new products find use as chemical intermediates in condensing with active methylene compounds, forming dihydrocarbylaminomethylene derivatives. More particularly, these new products can be condensed with active methylene compounds, such as malononitrile and the like, to form the dihydrocarbylaminomethylene malononitrile as illustrated with different intermediates but with the same product by Eiden, Angew. Chem. 72, 77 (1960), and by Hafner et al., ibid., 71, 672 (1959).

These new bis(disubstitutedamino)monohydrocarbyloxyhydrocarbons are also useful in the formation of the corresponding tetrakis(disubstitutedamino)ethylenes by direct heating. The tetrakis(disubstitutedamino)ethylenes are generically useful as high energy fuels for rocket and space propulsion. These tetrakis(disubstitutedamino)ethylenes have specific impulses in the ranges of those of hydrazine and methylhydrazine with $N_2O_4$, $HNO_3$, or other like strong oxidizing agents under rocket motor conditions.

The tetrakis(disubstitutedamino)ethylenes are especially useful as high energy fuels since they exhibit not only high specific impulses but also high heats of combustion. Thus, the heat of combustion of 1,3'-diethyl-1',3-dimethyl-$\Delta^{2,2'}$-bi(imidazolidine) is 8770 cal./g. and that of 1,1',3,3'-tetraethyl-$\Delta^{2,2'}$-bi(imidazolidine) is 8970-9010 cal./g. The 1,1',3,3'-tetramethyl-$\Delta^{2,2'}$-bi(imidazolidine) is so active that is spontaneously fires when pressured to about 40 p.s.i. with oxygen. Accordingly, a specific value for the heat of combustion thereof has not been obtained, but it is obviously high.

These new tetrakis(disubstitutedamino)ethylenes are also generically useful as moderate to strong organic reducing agents. Thus, they can successfully carry out such reductions as $S_2O_8^= \rightarrow 2SO_4^=$; $MnO_4^- \rightarrow MnO_2$;

$$PbO_2 \rightarrow Pb^{+2}$$

$Cr_2O_7^= \rightarrow 2Cr^{+3}$; $Br_2 \rightarrow 2(Br^-)$; $IO_3^- \rightarrow I^-$; $Hg^{+2} \rightarrow Hg^\circ$; $Ag^+ \rightarrow Ag^\circ$; $Fe^{+3} \rightarrow Fe^{+2}$; $AsO_4^{-3} \rightarrow AsO_2^-$ $$Cu(NH_3)_2^+ \rightarrow Cu^\circ$$

and the like.

These new tetrakis(disubstitutedamino)ethylenes are also generically useful as oxygen scavengers and serve thereby, for instance, as gasoline stabilizers, especially for the more conventional leaded gasolines, to prevent deterioration of the fuels on standing. The tetrakis(disubstitutedamino)ethylenes are not only useful as oxygen scavengers but form basis for a suitable analytical procedure for determining the amount of oxygen in a system by simply putting a known quantity of the aminoethylene in the system in question and determining the amount of carbonyl formed when reaction was complete.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises reacting together, at a temperature in the range 25–250° C.,
   (A) an amide acetal of the formula
   $$R_2NCH(OR')_2$$
   wherein:
   (1) the two R's, which need not be the same, are selected from the group consisting of monovalent alkyl and cycloalkyl of no more than 8 carbons each and divalent alkylene of 1–6 carbons; and
   (2) the two R''s, which need not be the same, are selected from the group consisting of monovalent alkyl, aryl, aralkyl, alkaryl and cycloalkyl of no more than 8 carbons each and divalent alkylene of 2–4 carbons, and
   (B) a secondary amine of the formula
   $$R''_2NH$$
   wherein: the two R'''s, which need not be the same, are selected from the group consisting of:
   (1) monovalent alkyl, cycloalkyl, oxahydrocarbon, azahydrocarbon, and oxaazahydrocarbon of no more than 8 carbons, each nitrogen carrying no more than one methyl; and
   (2) divalent alkylene, oxahydrocarbon, and azahydrocarbon of 1–6 carbons.

2. The process of claim 1 where in the amide acetal is an $\alpha,\alpha$-dialkoxytrialkylamine.

3. The process of claim 1 wherein the amide acetal is $\alpha,\alpha$-dimethoxytrimethylamine.

4. The process of claim 2 wherein the amine is pyrrolidine.

5. The process of claim 2 wherein the amine is piperidine.

6. The process of claim 2 wherein the amine is morpholine.

7. The process of claim 2 wherein the amine is N-methylpiperazine.

8. The process of claim 2 wherein the amine is N,N'-dimethylethylenediamine.

9. The process of claim 2 wherein the amine is N,N'-diethylethylenediamine.

10. The process of claim 2 wherein the amine is N-ethyl-N'-m-ethylethylenediamine.

11. The process of claim 2 wherein the amine is N-N'-dimethyl-1,3-propanediamine.

12. The process of claim 2 wherein the amine is 2,5-dimethylpyrrolidine.

13. The process of claim 2 wherein the amine is di-n-propylamine.

14. The process of claim 2 wherein the amine is 1,1,3,3-tetramethylguanidine.

15. The process of claim 2 wherein the amine is N,N'-dibenzylethylenediamine.

16. A compound of the group consisting of:

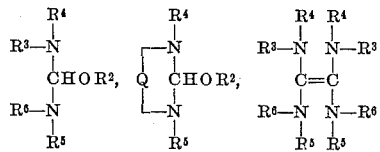

and

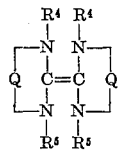

wherein:
(A) $R^2$ is selected from the group consisting of alkyl, aryl, aralkyl, alkaryl and cycloalkyl of up to 8 carbons;
(B) $R^3$ and $R^4$ are selected from the group consisting of monovalent alkyl, cycloalkyl, oxahydrocarbon azahydrocarbon, and oxaazahydrocarbon of up to 8 carbons, each depicted nitrogen carrying no more than one methyl, and divalent alkylene of 2–6 carbons;
(C) $R^5$ and $R^6$ are selected from the group consisting of monovalent alkyl, cycloalkyl, oxahydrocarbon, azahydrocarbon, and oxaazahydrocarbon of up to 8 carbons, each depicted nitrogen carrying no more than one methyl, and divalent alkylene of 2–6 carbons; and
(D) Q is alkylene of 1–4 carbons.

17. Bis(N-pyrrolidinyl)methoxymethane.
18. Tetrakis(N-pyrrolidinyl)ethylene.
19. Bis(N-piperidino)methoxymethane.
20. Tetrakis(N-piperidino)ethylene.
21. Bis(N-morpholino)methoxymethane.
22. Tetrakis(N-morpholino)ethylene.
23. Bis[N-(N'-methyl)piperazinyl]methoxymethane.
24. Tetrakis[N-(N'-methyl)piperazinyl]ethylene.
25. 1,1',3,3'-tetramethyl-$\Delta^{2,2'}$-bi(imidazolidine).
26. 1,1',3,3'-tetraethyl-$\Delta^{2,2'}$-bi(imidazolidine).
27. 1,3'-diethyl-1',3-dimethyl-$\Delta^{2,2'}$-bi-(imidazolidine).
28. 1,3-dimethyl-2-methoxyhexahydropyrimidine.
29. 1,1',3,3'-tetramethyl-$\Delta^{2,2'}$-bi(hexahydropyrimidine).
30. Dimethoxymethyl-2,5-dimethylpyrrolidine.
31. Bis[N-(2,5-dimethylpyrrolidinyl)]methoxymethane.
32. Tetrakis[bis(dimethylamino)methyleneamino]ethylene.
33. 1,1',3,3'-tetrabenzyl-$\Delta^{2,2'}$-bi(imidazolidine).
34. Bis(di-n-propylamine)methoxymethane.
35. Bis[bis(dimethylamino)methyleneamino]methoxymethane.

References Cited by the Examiner

UNITED STATES PATENTS

| | | | |
|---|---|---|---|
| 2,437,963 | 3/1948 | Langmuir et al. | 252—305 |
| 2,440,915 | 5/1948 | Roehr | 252—305 |
| 2,620,311 | 12/1952 | Bleeker | 252—301.2 |
| 2,681,317 | 6/1954 | Grossman | 252—301.2 |
| 2,916,490 | 12/1959 | Schenck et al. | 260—247 |
| 2,993,894 | 7/1961 | Marcus et al. | 260—247 |

WALTER A. MODANCE, *Primary Examiner.*

REUBEN EPSTEIN, CARL D. QUARFORTH,
*Examiners.*

W. T. HOUGH, L. A. SEBASTIAN, ROBERT T. BOND,
*Assistant Examiners.*